United States Patent [19]

Cordes et al.

[11] Patent Number: 5,767,500
[45] Date of Patent: Jun. 16, 1998

[54] AUTOMATIC IDENTIFICATION OF HARDWARE

[75] Inventors: Kevin Cordes, Miller Place; Ellen Oppenheim, Coram; Donna Pandolfo, Ronkonkoma; Robert May, Sayville; Joseph Campanelli, Centereach; Thomas Bianculli, Northport, all of N.Y.

[73] Assignee: Symbol Technologies, Inc., Holtsville, N.Y.

[21] Appl. No.: 597,694

[22] Filed: Feb. 6, 1996

[51] Int. Cl.⁶ ............................................ G06K 07/10
[52] U.S. Cl. ........................ 255/472; 340/568; 235/472
[58] Field of Search ............................ 237/462, 472, 237/454; 403/28; 324/207.25, 537, 512, 522; 340/568, 572, 538

[56] References Cited

U.S. PATENT DOCUMENTS

| | | | |
|---|---|---|---|
| 3,381,133 | 4/1968 | Barnes et al. | 257/459 |
| 3,684,868 | 8/1972 | Christie et al. | 250/219 |
| 3,716,699 | 2/1973 | Eckert et al. | 235/463 |
| 3,727,030 | 4/1973 | McMurtry | 250/219 |
| 3,758,782 | 9/1973 | Radford et al. | 250/239 |
| 3,784,794 | 1/1974 | Allais | 235/61.11 E |
| 3,809,893 | 5/1974 | Dobras | 250/227 |
| 3,916,184 | 10/1975 | Turner et al. | 250/227 |
| 3,985,999 | 10/1976 | Yoneyama | 235/61.11 E |
| 4,013,893 | 3/1977 | Hertig | 250/568 |
| 4,115,703 | 9/1978 | Dobras | 250/568 |
| 4,127,932 | 12/1978 | Hartman et al. | 257/459 |
| 4,143,809 | 3/1979 | Uebbing et al. | 235/462 |
| 4,312,114 | 1/1982 | Schoolar | 257/459 |
| 4,467,273 | 8/1984 | Rudolph et al. | 324/65 R |
| 4,486,114 | 12/1984 | Rudolph et al. | 403/27 |
| 4,575,714 | 3/1986 | Rummel | 340/568 |
| 4,675,531 | 6/1987 | Clark et al. | 250/568 |
| 4,831,275 | 5/1989 | Drucker | 235/472 |
| 4,882,478 | 11/1989 | Hayashi et al. | 250/211 R |
| 4,963,756 | 10/1990 | Quan et al. | 235/472 |
| 5,051,567 | 9/1991 | Tedesco | 235/462 |
| 5,122,644 | 6/1992 | Hasegawa et al. | 235/472 |

(List continued on next page.)

FOREIGN PATENT DOCUMENTS

| | | | |
|---|---|---|---|
| 220482 | 9/1986 | Japan | 257/459 |
| 182874 | 7/1988 | Japan | 257/465 |
| 224268 | 9/1988 | Japan | 257/48 |

OTHER PUBLICATIONS

Metlitsky, B., *Laser Bar Code Scanning: A System Design and Analysis Model*, Symbol Technologies, Inc. publication, Jul. 1990.

*Bar Code System Considerations*, Symbol Technologies, Inc. publication, Dec. 1989.

Symbol Technologies, Inc., "SDT: New Scanning Data Terminal—Supports Both Bar Code Reading and Manual Data Entry," *Symbol MSI*, Part 789 MX, 1989 no month.

*Primary Examiner*—Donald T. Hajec
*Assistant Examiner*—Thiew Minh Le
*Attorney, Agent, or Firm*—Fish & Richardson P.C.

[57] ABSTRACT

A hardware identification system is provided in a bar code reading arrangement including a main body and a plurality of modular detachable scanning heads connectable to the main body dependent on the application desired for the reader. Each of the heads includes a voltage divider dividing identification voltage and the main body includes a microprocessor including an analog to digital converter which reads the identification voltage, converts it to a digital signal and compares the identification voltage against a look-up table of identification voltages and their associated hardware element to identify the module type. Alternatively, or in addition, the module may be similarly configured to identify the main body by virtue of an identification voltage defined by a voltage divider in the main body. Alternatively the hardware identification system includes an electronic subassembly such as a PC board used for example in computer systems for automatic identification of hardware.

16 Claims, 3 Drawing Sheets

U.S. PATENT DOCUMENTS

| | | | |
|---|---|---|---|
| 5,136,147 | 8/1992 | Metlitsky et al. | 235/472 |
| 5,140,142 | 8/1992 | Atsushi | 235/472 |
| 5,164,581 | 11/1992 | Shiga | 250/208.6 |
| 5,278,397 | 1/1994 | Barkan et al. | 235/462 |
| 5,352,922 | 10/1994 | Barkan et al. | 257/459 |
| 5,410,141 | 4/1995 | Koenck et al. | 235/472 |
| 5,506,392 | 4/1996 | Barkan et al. | 235/472 |
| 5,539,194 | 7/1996 | Miller et al. | 235/472 |

AUTOMATIC IDENTIFICATION OF HARDWARE

BACKGROUND OF THE INVENTION

Field of the Invention

The invention relates to an apparatus and method for the automatic identification of hardware, in particular for identification of modular components connected to one another at an interface. In particular the invention relates to bar code scanners including a predefined set of scan heads and host interfaces.

Various readers and optical scanning systems have been developed for reading printed indicia such as bar code symbols appearing on a label or the surface of an article and providing information concerning the article such as the price or nature of the article. The bar code symbol itself is a coded pattern of indicia comprised of, for example, a series of bars of various widths spaced apart from one another to form spaces of various widths, the bars and spaces having different light reflecting characteristics. The readers electro-optically transform the graphic indicia into electrical signals which are decoded into alpha-numeric characters that are intended to be descriptive of the article or a characteristic thereof. Such characters typically are represented in digital form, and utilised as an input to a data processing system for applications in point of sale processing, inventory control and the like.

Known scanning systems comprise a light source for generating a light beam incident on a bar code symbol and a light receiver for receiving the reflected light and decoding the information contained in the bar code symbol accordingly. The readers may comprise a flying spot scanning system wherein the light beam is scanned rapidly across a bar code symbol to be read or a fixed field of view reading system wherein the bar code symbol to be read is illuminated as a whole and a CCD (Charge Coupled Device) array is provided for detecting the light reflected from the bar code symbol. The reader may be either a hand-held device or a surface-mounted fixed terminal.

Often it is desired to vary parameters of the bar code reader. For example in some applications a fixed field of view bar code reader may be required whereas in other applications a flying spot bar code reader may be required. Alternatively, different types of readers may be required for reading different types of symbol, or symbols placed at different distances or requiring reading at different resolutions.

It has been proposed, therefore, to provide a single main body (host interface) and a plurality of interchangeable scan heads which are connected to the main body dependent on what type of application is desired. The necessity for replacement or reconfiguration of a single integral unit is thus avoided. The unit is also adaptable to receive other head modules, for example audio or visual recording modules, transmission modules capable of communicating by a wireless communication with a host computer and connectable, for example to the internet and any other module suitable for a given application.

One parameter limiting the interchangeability of the modules is the ability of the module and the main body to recognise the element to which it has been connected and configure itself accordingly. For example it is possible to program either of the elements prior to connection or one or other parts may include an input device such as a keypad allowing the user to insert a suitable identification code or other information allowing the elements to configure themselves appropriately. It will be appreciated that such arrangements reduce the efficiency and speed at which the modules can be interchanged.

Efforts are currently being made to improve efficiency, accuracy and quality levels in electronics manufacturing systems. One initiative that has been introduced and is well known in the art is the concept of Poka-Yoke (see for example "Electronics Packaging and Production" R. O'Black Vol. 28 No. 3 Mar. 1988, pages 66–69). The term is a Japanese word being mistake-proofing and the approach centres around the idea of "zero quality control" in which, in contrast to traditional statistical quality control methods, production within a system is stopped whenever there is a detected defect and is not commenced until measures have been taken to prevent the reoccurrence of the defect. A key part of the procedure is source inspection according to which steps are taken to identify mistakes and rectify the situation before defects occur. Accordingly improved methods of automatic hardware detection are desired to enhance both the poka-yoke procedure and other types of quality control systems in the manufacturing of hardware components such as PC boards and other electronic sub-assemblies such as those used in computer systems.

SUMMARY OF THE INVENTION

Objects of the Invention

It is an object of the present invention at least to alleviate the problems of the prior art. It is a further object to provide a system capable of automatically identifying hardware.

Features of the Invention

According to the invention there is provided a computer hardware recognition system comprising a first hardware element and a second hardware element, the first and second hardware element being connectable to one another, the first hardware element comprising a voltage divider defining an identification voltage, and the second hardware element including a processor arranged to measure the identification voltage and compare the identification voltage with a look-up table of identification voltages and associated hardware elements to identify the first hardware element. As a result, the element is identified automatically, making interchanging of elements simpler and more rapid.

The voltage divider preferably comprises two resistors each having a selected value of resistance connected in series between ground and a reference voltage and the processor is arranged to access the reference voltage. A simple system based only on the ratio of resistance values is thus arrived at.

The processor may be a microprocessor including an analog to digital converter for obtaining a digital representation of the identification voltage. Improved accuracy is thus achieved.

The processor may be arranged to take a plurality of readings of the identification voltage to arrive at a more accurate representation of the identification voltage. Improved resolution accordingly allows a wider range of identification voltages without improving the tolerances and accuracy of the components.

The first hardware element may be one of a main body or a head module and the second hardware element may be the other of a main body or head module. The main body may be a hand-held optical reader main body and the module head may be an optical reading head. A plurality of interchangeable reading heads may be provided.

An interface element may be provided, the interface element connecting the first hardware element and the second hardware element and an identification voltage is associated with the interface element for recognition by a processor by reference to a look-up table.

According to the invention there is further provided a reader arrangement comprising a main body and a detachable reading head as hardware elements, one of the main body and reading head being provided with a voltage divider defining an identification voltage and the other of the main body and reading head being provided with a processor arranged to measure the identification voltage and compare it with the values in a look-up table of identification voltages and associated hardware element to identify the hardware element.

The reader may be a flying spot optical scanner or a field of view optical reader.

According to the invention there is further provided a method of identifying a first hardware element in which the first hardware element is connected to a second hardware element, the first hardware element including a voltage divider and the second hardware element including a processor, in which the voltage divider defines an identification voltage, the processor reads the identification voltage, compares the identification voltage with a look-up table of identification voltages and associated hardware elements, and the processor identifies the first hardware element accordingly. The processor may carry out an analog to digital conversion of the identification voltage and compare the digitized voltage with the look-up table.

The processor may take repeated readings of the identification voltage and statistically manipulate the readings to arrive at an improved value for the identification voltage.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings wherein like elements are designated by identical reference numerals throughout several views, and in which:

FIG. 1 illustrates a typical bar code reader. The reader comprises a hand-held laser scanner, generally indicated at 700, having a main body 535 including a graspable hand portion 536 which carries a trigger 539. Within the body 535 is a laser module 515 (not shown in detail). Light from the laser module 515 is arranged to shine onto an oscillating mirror provided in the body 535. The resultant reflected beam passes through a lens, and out of the housing via a window 538. The mirror is arranged to oscillate in such a way that the beam traces out a scan line 513 across a bar code 600 to be recorded. In the example shown in FIG. 1, the bar code 600 is a linear bar code, but it will of course be appreciated that the scanner could instead be arranged to read two-dimensional bar codes: in such a case the mirror would be controlled to produce a raster scan rather than a single line scan.

Light reflected back from the bar code 600 passes through the window 538, is collected by a collecting mirror, from where it is reflected back to a photodetector. The optical signal is then converted into an electrical signal, and the features of the bar code symbol 600 determined.

Figure 1:
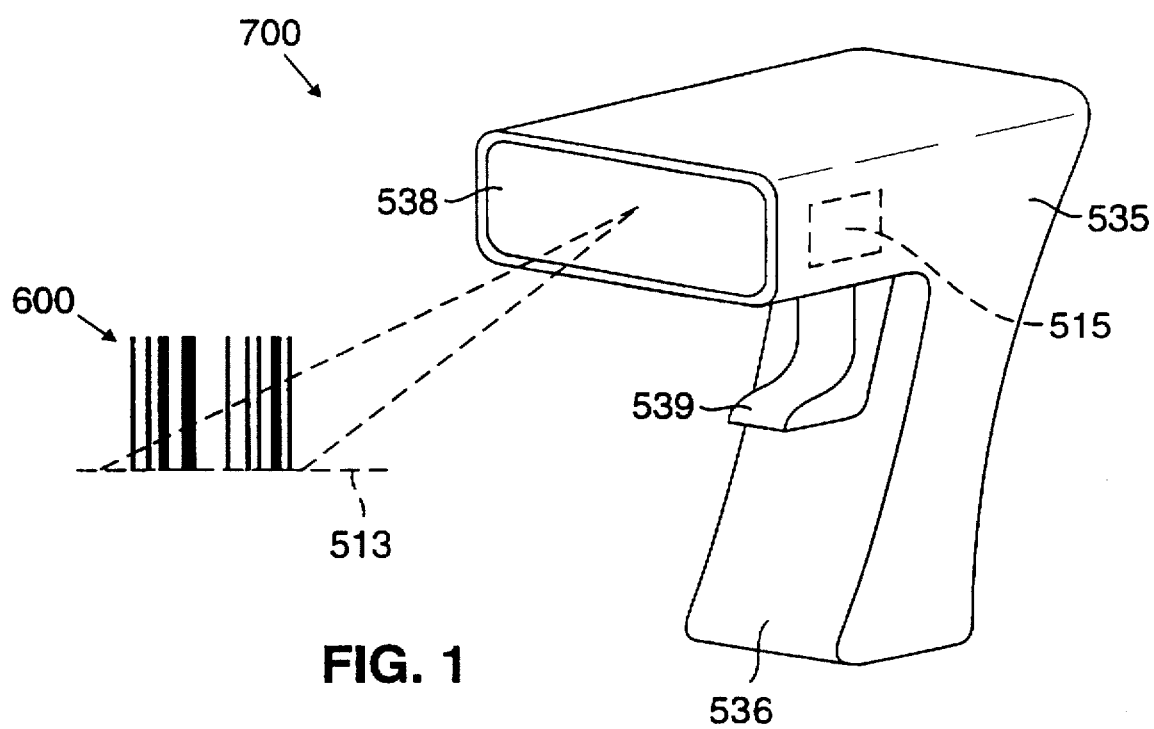
FIG. 1 shows a conventional bar code reader.
Figure 2:
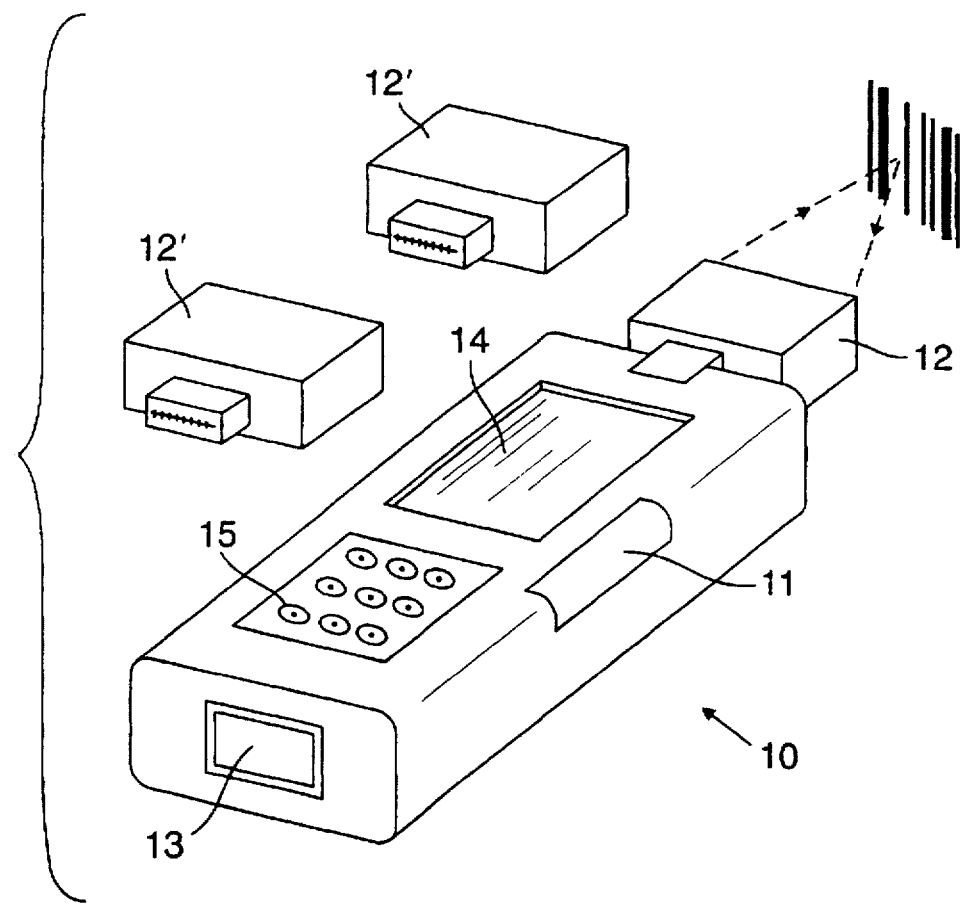
FIG. 2 shows a reader according to the present invention.

In an alternative arrangement the reader may comprise a hand-held laser scanner such as that shown in FIG. 2 comprising, for example, a bar-shaped body 10 having a trigger or actuator 11, a scanner head 12 and optionally a communications interface 13 and a display 14. The trigger 11 may be situated so as to be easily actuable by the thumb of a reader holding the bar-shaped reader 10 in the palm of the user's hand, and the display 14 and the communications interface 13 may be similarly placed so as to enable easy viewing of the display by the user and unobstructed communication. The communications interface 13 may be, for example, an infrared or radio transmitter or may be an interface to physical wiring to a host computer. The communications interface 13 can be used to down-load information stored in the reader 10. The display may be an LCD display for displaying information as to the operation of the reader, identification of the user and so on. In addition a keypad 15 may be provided for entering information into the reader.

The head 12 is detachable from the remainder of the reader 10 and connects to the reader 10 by means of any suitable interface such as a pin-type IBM46XX or RS232interface. Accordingly the module 12 may be simply detached and replaced by an alternative module 12'. Thus the reader may be simply and quickly configured dependent on what type of application is desired, for example class 1 or class 2 laser scan heads may be interchanged.

Figure 3:
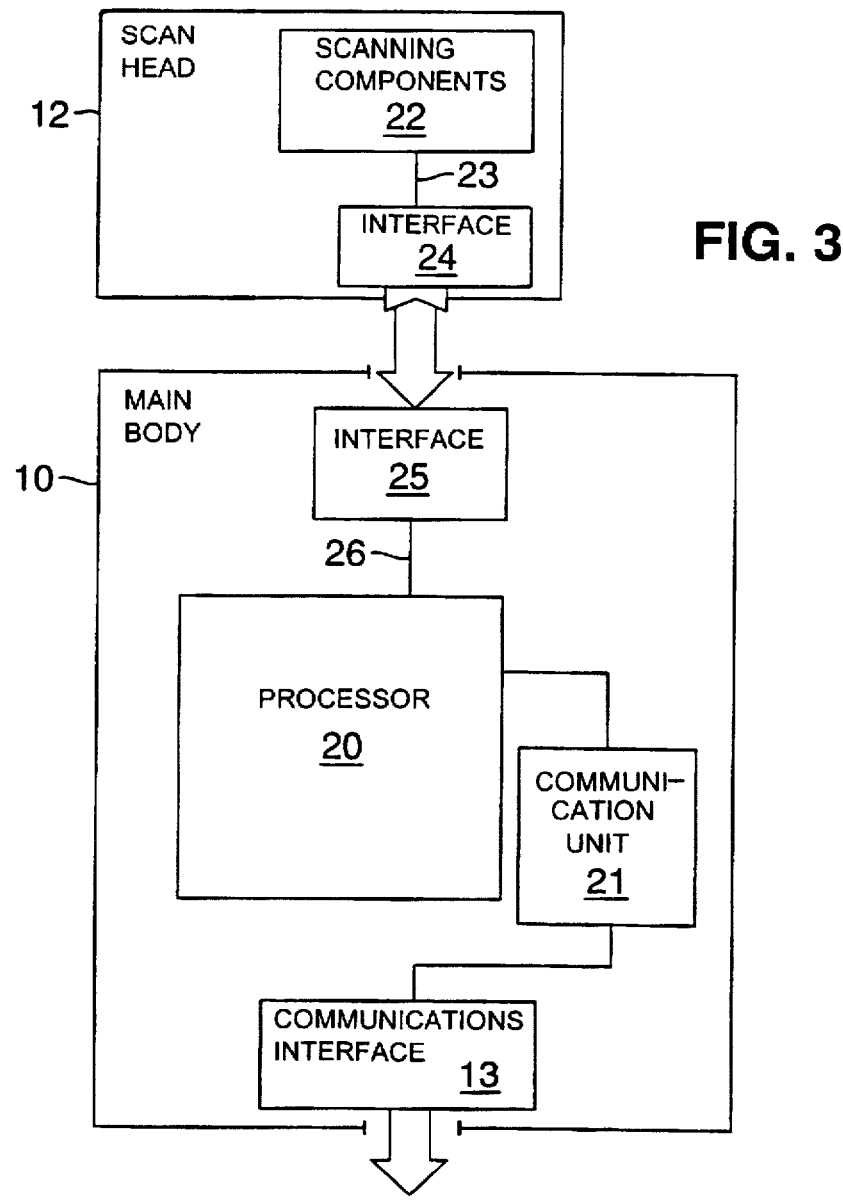
FIG. 3 is a block diagram of the reader of FIG. 2.

A block diagram of a reader 10 is shown in FIG. 3. The reader 10 includes a processor 20 for processing information received from the scan head 12 and, optionally, a communications unit 21 for communicating information down-loaded from the reader 10 via communications interface 13. The scan head 12 includes scanning components such as a laser light generating source and a detector for detecting light received from a symbol to be read, together with analogue to digital conversion means for converting the receiver signal into a digital signal, all of which are shown generally by block 22. A digital signal is transferred from block 22 via a bus 23 to an interface 24 which communicates with an interface 25 of the main body of the reader 10. The digital signal is then communicated via a bus 26 from the interface 25 to the processing unit 20 of the main body. In the embodiment shown, only the raw digital signal is transferred via a bus 23 and interface 24 from the scan head, and the majority of the processing of the signal is carried out by the processing unit 20 in the main body. In an alternative system a large amount of the processing can be carried out "up front" in the scan head itself by suitable processor means which decreases the burden on the processor 20 in the main body of the reader 10. Such an arrangement also allows a simplified bus architecture from the scan head rendering it yet easier to provide a large number of interchangeable scan heads all communicating with a common unit.

Figure 4:
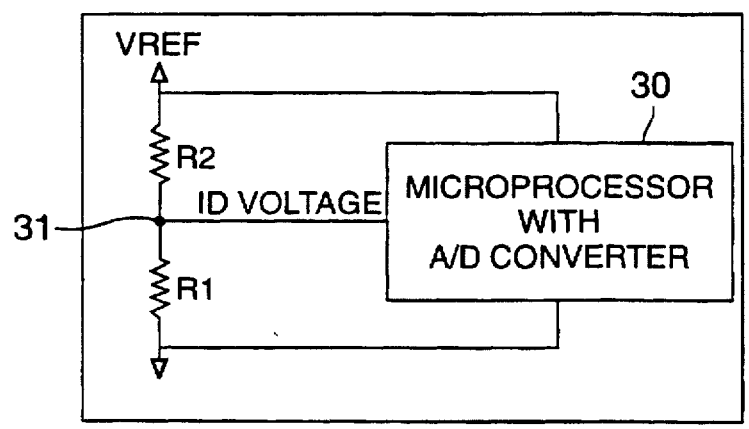
FIG. 4 is a circuit diagram of the hardware recognition portion of the reader of FIG. 2.

The invention is discussed with further reference to FIG. 4. The invention solves the problem if identifying a particular hardware configuration of the module by a digital subsystem of the main body using a microprocessor equipped with an analogue to digital converter. It will be appreciated that the process may work either way, that is, the module may wish to identify the main body type into which it has been inserted or the main body may wish to identify the module which has been connected to it.

The automatic identification system comprises two resistors R1 and R2 connected in parallel with a microprocessor-based system 30 containing an analogue to digital converter. The two resistors R1 and R2 form a voltage divider providing an identification voltage at a point 31 between the two resistors R1 and R2. It will be seen that the identification voltage will vary in dependence upon the values of R1 and R2 which are selected so as to provide different values for a given hardware configuration, i.e. for each scan head module type or main body type. The divided identification voltage is input to the analogue to digital converter of the microprocessor and the software running on the microprocessor initiates an analogue to digital conversion to obtain a digital representation of the identification voltage. Because the values of R1 and R2 are preselected according to the module or reader type with which they are associated, a unique identification voltage will be associated with each module or reader type. A table is stored in the memory of the microprocessor 30 containing the different possible values of the identification voltage and the associated module or reader type. The microprocessor includes software for carrying out the table look-up to determine which hardware configuration is present.

A reference voltage $V_{REF}$ is established across the resistors to earth 32 and the reference voltage is made common for the voltage divider and the analogue to digital converter as a result of which the identification voltage can be defined simply by changing the values of R1 and R2; in other words it is only the ratio of R1 to R2 that determines the identification voltage. It will be appreciated that a wide range of identification voltages can be established dependent on the values of R1 and R2 available. For example, assuming a resistor tolerance of 1% and a 4.5 LSB conversion error on the analogue to digital converter (the analogue digital converter having 12-bits of resolution) and 100 mV of noise, a minimum of 12 unique configurations can be realised. That range of configurations is arrived at taking a worst case scenario as regards the possible errors involved; if the noise in the system is reduced of the order of 30 unique configurations, allowing 30 corresponding identification voltages can be achieved.

The process may be further enhanced if the microprocessor is arranged to perform several analogue to digital conversions of the identification voltage which can be compared, averaged or otherwise statistically manipulated to arrive at a more accurate result of the identification voltage. In that case a larger number of unique configurations giving rise to a corresponding number of unique identification voltages can be achieved.

In practice the microprocessor 30 can be inserted in the main body of the reader 10 and/or in the scan head module 12 in which case the voltage divider R1,R2 would be provided in the complementary hardware portion. The identifying circuitry may be peripheral to the main interface device or integral with the main interface device as desired.

Where, for example, the module is to be identified by the identification voltage then the resistors R1 and R2, the connection 31 and the reference voltage are provided in the scan head module and, on connection of the scan head module to the main body, a microprocessor 30 found in the main body is connected to the reference voltage and connection point 31 to identify the module. The elements are interchanged as appropriate if it is desired that the main body should be identified by the identification voltage. Of course two-way identification can take place simultaneously.

Not only can the system be arranged to recognise the module type associated with the identification voltage, but a similar system may be set up to provide an identification of the interface type between the parts (for example IBM46XX or RS-232). In that case a unique value of R1 and R2 is associated with each type of interface and a reference table linking identification voltage with interface type is stored and accessed on connection of the parts.

Accordingly the invention overcomes the problem of previous systems in which there were required separate software configurations for each hardware configuration. The invention allows a single version of software to automatically identify what hardware is present and then configure itself accordingly. For example, once an identification voltage has been read and the appropriate hardware configuration has been identified from the look-up table then the microprocessor may contain circuitry itself or may send an appropriate signal to a processor within the body of the element in which it is found to configure the element accordingly for connection and communication with the identified hardware configuration. In the case of bar code scanners, given a predefined set of scan heads and host interfaces a single version of software can identify which scan head and/or host interface from the predefined set is present.

The above discussion has been directed at modular bar code scanners but it will be appreciated that the principles discussed above can be extended to any types of hardware such as electronic sub-assemblies (for example PC boards) used in computer systems or other electronic systems. The hardware identification system can be used either during the manufacturing process or during subsequent assembly of components, or indeed for "add ons" to manufactured equipment. For example, when a PC board is being assembled, hardware components added to the board can include a voltage divider of the type discussed above allowing its automatic recognition on connection to the board. The system can be used in conjunction with quality control procedures, for example zero quality control methods in order to detect potential errors (for example the connection of an incorrect component) at source and remedy those errors instantly if desired.

Without further analysis, the foregoing will so fully reveal the gist of the present invention that others can readily adapt to various applications without omitting features that, of the standpoint of prior art, fairly constitute essential characteristics of the generic or specific aspects of the invention and, therefore, such adaptions should and are intended to be compounded within the meaning and range of equivalents of the following claims.

We claim:

1. A computer hardware recognition system comprising a first hardware element and a second hardware element, the first and second hardware element being connectable to one another, the first hardware element comprising a voltage divider defining an identification voltage, and the second hardware element including a processor arranged to measure the identification voltage and compare the identification voltage with a look-up table of identification voltages and associated hardware elements to identify the first hardware element, wherein the voltage divider comprises two resistive elements each having a selected value of resistance connected in series between ground and a reference voltage and the processor is arranged to access the reference voltage.

2. A system as claimed in claim 1 in which the processor is a microprocessor including an analog to digital converter for obtaining a digital representation of the identification voltage.

3. A system as claimed in claim 1 in which the first hardware element is one of a main body or a head module and the second hardware element is the other of a main body or head module.

4. A system as claimed in claim 3 in which the main body is a hand-held optical reader main body and the module head is an optical reading head.

5. A system as claimed in claim 4 in which a plurality of interchangeable reading heads are provided.

6. A system as claimed in claim 1 in which an interface element is provided, the interface element connecting the first hardware element and the second hardware element and an identification voltage is associated with the interface element for recognition by a processor by reference to a look-up table.

7. A system as claimed in claim 1 in which the system is a reader, the first hardware element is a detachable reading head and the second hardware element is a main body.

8. A reader as claimed in claim 7 comprising a flying spot optical scanner.

9. A reader as claimed in claim 7 comprising a field of view optical reader.

10. A system as claimed in claim 1 in which the system is a reader, the first hardware element is a main body and the second hardware element is a detachable reading head.

11. A system as claimed in claim 1 in which each resistive element consists of a single resistor.

12. A computer hardware recognition system comprising a first hardware element and a second hardware element, the first and second hardware element being connectable to one another, the first hardware element comprising a voltage divider defining an identification voltage, and the second hardware element including a processor arranged to measure the identification voltage and compare the identification voltage with a look-up table of identification voltages and associated hardware elements to identify the first hardware element, wherein the processor is arranged to take a plurality of readings of the identification voltage to arrive at a more accurate representation of the identification voltage.

13. A method of identifying a first hardware element in which the first hardware element is connected to a second hardware element, the first hardware element including a voltage divider and the second hardware element including a processor, in which the voltage divider defines an identification voltage, the processor reads the identification voltage, compares the identification voltage with a look-up table of identification voltages and associated hardware elements, and the processor identifies the first hardware element accordingly, wherein the voltage divider comprises two resistive elements each having a selected value of resistance connected in series between ground and a reference voltage and the processor is arranged to access the reference voltage.

14. A method as claimed in claim 13 in which the processor carries out an analog to digital conversion of the identification voltage and compares the digitized voltage with the look-up table.

15. The method claimed in claim 13 in which each resistive element consists of a single resistor.

16. A method of identifying a first hardware element in which the first hardware element is connected to a second hardware element, the first hardware element including a voltage divider and the second hardware element including a processor, in which the voltage divider defines an identification voltage, the processor reads the identification voltage, compares the identification voltage with a look-up table of identification voltages and associated hardware elements, and the processor identifies the first hardware element accordingly, wherein the processor takes repeated readings of the identification voltage and statistically manipulates the readings to arrive at an improved value for the identification voltage.

* * * * *